United States Patent
Suzuki (12) 
(10) Patent No.: US 6,791,946 B1
(45) Date of Patent: Sep. 14, 2004

(54) METHOD OF CONNECTION RESERVATION CONTROL OF AN ATM COMMUNICATION NETWORK AND AN ATM EXCHANGE FOR PERFORMING THE SAME

(75) Inventor: Makoto Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/444,573

(22) Filed: Nov. 19, 1999

(30) Foreign Application Priority Data

Nov. 20, 1998 (JP) .......................................... 10-330299

(51) Int. Cl.⁷ ........................ H04L 12/28; H04L 12/56
(52) U.S. Cl. ................. 370/236.2; 370/395.2
(58) Field of Search ................. 370/230, 231, 370/235, 236.2, 241.1, 395.2, 395.21, 395.3, 395.31, 398, 399, 395.4, 395.41, 395.42, 395.43, 410, 468, 236

(56) References Cited

U.S. PATENT DOCUMENTS

| | | | |
|---|---|---|---|
| 5,333,134 A | | 7/1994 | Ishibashi et al. |
| 5,896,371 A | * | 4/1999 | Kobayashi et al. ......... 370/232 |
| 6,141,322 A | * | 10/2000 | Poretsky ..................... 370/231 |
| 6,167,025 A | * | 12/2000 | Hsing et al. ................ 370/216 |
| 6,275,493 B1 | * | 8/2001 | Morris et al. ............ 370/395.4 |
| 6,434,152 B1 | * | 8/2002 | Yamamura ............... 370/395.2 |

FOREIGN PATENT DOCUMENTS

| | | |
|---|---|---|
| CN | 1130333 | 9/1996 |
| JP | 4-239950 | 8/1992 |
| JP | 5-160851 | 6/1993 |
| JP | 10-164069 | 6/1998 |

* cited by examiner

Primary Examiner—Ajit Patel
(74) Attorney, Agent, or Firm—Sughrue Mion, PLLC (57) ABSTRACT

A terminal-side message processing unit (3) of an ATM exchange (10) reserves a virtual connection that has been used for a communication between a transmitter terminal accommodated in the ATM exchange and a receiver terminal by registering the information of the virtual connection in a reserved-connection table (104) without releasing the virtual connection when a connection release request of the virtual connection is requested by the transmitter terminal, and reopens the communication between the transmitter terminal and the receiver terminal by way of the virtual connection which has been reserved by referring to the reserved-connection table (104) when a connection setup request of the same connection with the virtual connection that has been reserved is requested.

18 Claims, 10 Drawing Sheets

| ITEM | CONNECTION INFORMATION(PORT1) | | CONNECTION INFORMATION(PORT2) | | BANDWIDTH |
|---|---|---|---|---|---|
| | TERMINAL ID | VIRTUAL CHANNEL ID | TERMINAL ID | VIRTUAL CHANNEL ID | |
| 1 | A | VPI=0, VCI=32 | B | VPI=1, VCI=32 | 10Mbps |
| 2 | | | | | |

FIG.6

0xa0 : COMMUNICATION SUSPENSION
0xa1 : COMMUNICATION REOPEN

FIG.9A

☒ : TERMINAL

◯ : ATM EXCHANGE OF THE INVENTION

□ : CONVENTIONAL ATM EXCHANGE

METHOD OF CONNECTION RESERVATION CONTROL OF AN ATM COMMUNICATION NETWORK AND AN ATM EXCHANGE FOR PERFORMING THE SAME

BACKGROUND OF THE INVENTION

The present invention relates to connection control of virtual channels in an ATM (Asynchronous Transfer Mode) communication network, and particularly to a method of connection reservation control of an ATM communication network and an ATM exchange for performing the connection reservation control, wherein virtual channels are left reserved without executing their release.

In an ATM communication network, it is better for the resource efficiency to release a virtual connection every time when a communication, which has been performed thereby, is finished. However, somewhat complicated procedures are required for establishing and releasing the virtual connection.

Figure 10:
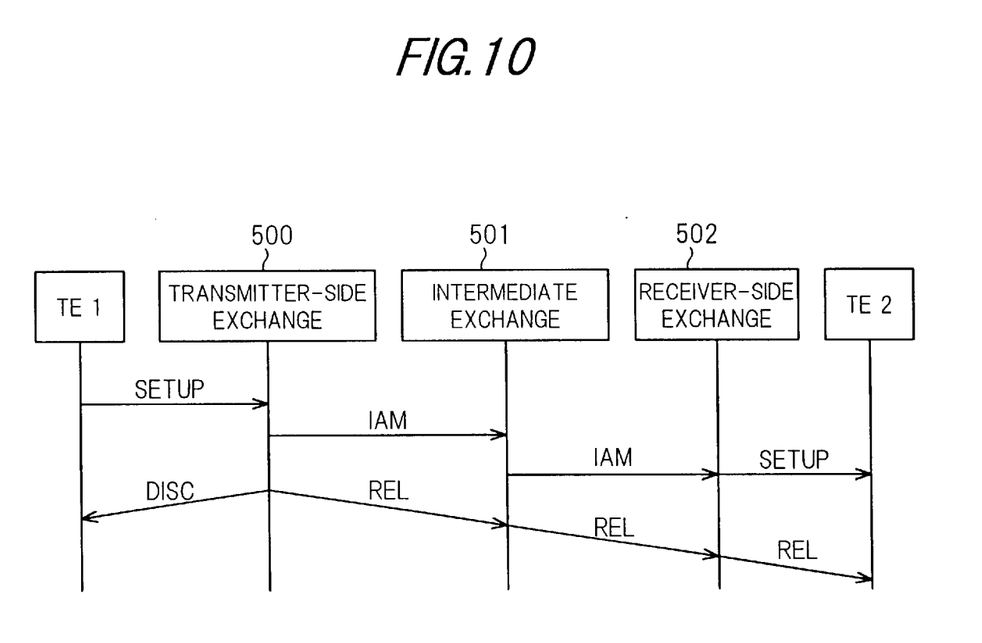
FIG. 10 is a sequence chart illustrating procedures to be performed for establishing and releasing a virtual connection in a conventional ATM communication network.

FIG. 10 is a sequence chart illustrating procedures to be performed for establishing and releasing a virtual connection between a transmitter terminal TE1 and a receiver terminal TE2 through a transmitter-side exchange 500, an intermediate exchange 501 and a receiver-side exchange 502.

For establishing a virtual connection, the transmitter terminal TE1 transmits a call setup request SETUP to the transmitter-side exchange 500. The transmitter-side exchange 500 outputs an address message IAM (Initial Address Message) to the intermediate exchange 501, which also outputs the same address message IAM to the receiver-side exchange 502. The receiver-side exchange 502 transmits a call setup request SETUP to the receiver terminal TE2. By performing such a sequence of procedures as above described, a virtual connection is established.

In a similar way, a disconnection notification DISC or releasing request REL should be exchanged between the transmitter terminal TE1, the transmitter-side exchange 500, the intermediate exchange 501, the receiver-side exchange 502 and the receiver terminal TE2, for releasing the virtual connection.

Figure 11:
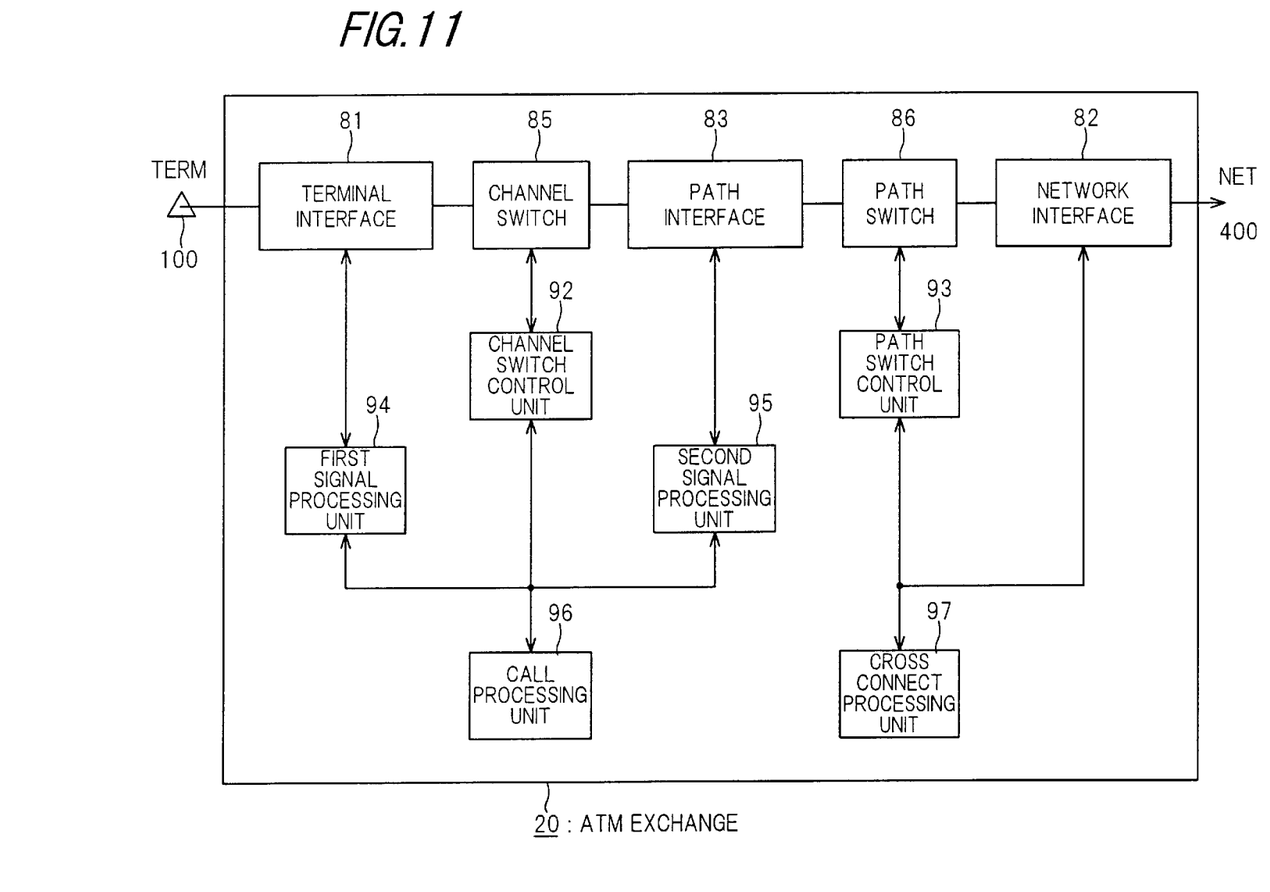
FIG. 11 is a block diagram illustrating a configuration of an ATM exchange according to a prior art.

FIG. 11 is a block diagram illustrating a configuration example of an ATM exchange taking charge of performing above procedures for establishing or releasing the virtual connection, which is described in a Japanese patent application laid open as a Provisional Publication No. 160851/'93.

Referring to FIG. 11, a first signal processing unit 94 performs necessary procedures for connecting a virtual channel between a terminal 100 and the ATM exchange 20. A second signal processing unit 95 performs necessary procedures for connecting or disconnecting a virtual channel between the ATM exchange 20 and a neighboring node of an ATM network 400.

Receiving a call setup request from the terminal 100 through a terminal interface 81 and the first signal processing unit 94, a call processing unit 96 selects a virtual channel of a quality of service demanded by the terminal 100 and transmits an initial address message towards the ATM network 400 through the second signal processing unit 95.

According to the virtual channel selected by the call processing unit 96, a channel switch control unit 92 controls a channel switch 85 to switch ATM cells from the terminal 100 according to the selected channel.

In the example of FIG. 11, a cross connect processing unit 97 takes charge of selecting an appropriate detour path for each group of virtual channels when a virtual path assigned to the group is congested. According to the selection of the cross connect processing unit 97, a path switch control unit 93 controls a path switch 86 to switch the virtual channel towards an appropriate port, by way of which ATM cells from the terminal 100 are transmitted through a network interface 82.

Thus, a virtual channel is connected to the terminal 100 in the ATM exchange 20.

When a releasing request of the virtual connection is received by the call processing unit 96 from the terminal 100, the call processing unit 96 retrieves the concerning virtual channel and transfers the releasing request towards the ATM network 400 through the second signal processing unit 95. The channel switch control unit 92 releases connection of the virtual channel in the ATM exchange 20 by deleting data of the virtual channel from the switching table of the channel switch 85.

Such procedures as performed in the ATM exchange 20 should be executed in each of: the transmitter-side exchange 500, intermediate exchange 501 and the receiver-side exchange 502 of FIG. 10, for establishing a virtual connection between the transmitter terminal TE1 and the receiver terminal TE2. In other words, the establishment or release of a virtual connection is performed through connecting or disconnecting two neighboring ATM exchanges or an ATM exchange with a terminal with a virtual channel, one by one, by exchanging connection requests or releasing requests between them.

Conventionally, the virtual connection is established or released as above described every time a call setup or a call disconnection is requested from a terminal. However, there have been following problems in such connection control.

First, even for a short suspension of a communication, the virtual connection established for the communication should be released, by disconnecting the concerning virtual channels in every ATM exchange which participates in the virtual connection through exchanging releasing requests between neighboring nodes. And, secondly, even when the virtual connection, which is once released, is to be established again between the same pair of terminals, the same procedures as performed for firstly establishing the virtual connection should be repeated for connecting a virtual channel in every ATM exchange by exchanging connection requests among them.

Therefore, when the call setup request or the call disconnection request occurs frequently, the procedures for connecting or disconnecting virtual channels in the ATM exchanges increase, resulting in degradation of connection establishment ability of the ATM communication network. When the call setup requests and the call disconnection requests of the same pairs of terminals are repeated frequently, the concerning ATM exchanges are forced to repeat duplicated procedures.

A method of resolving this problem is to establish PVCs (Permanent Virtual Connections) between pairs of terminals. However, the PVC is not flexible and therefore uneconomical to be assigned for connecting terminals whereof communication may be interrupted for a long time.

As a prior art for dealing with this problem, a terminal adapter is disclosed in a Japanese patent application laid open as a Provisional Publication No. 239950/'92. In this prior art, when the terminal adapter, which is connecting a terminal A to a communication network for communicating with a terminal B through the network, for example, receives a connection release request of the communication channel from the terminal A, the terminal adapter returns a connection release acknowledge signal to the terminal A. However, the terminal adapter reserves the communication channel being connected for a fixed period without releasing the connection.

Therefore, when a call setup with the terminal B is requested again by the terminal A during the fixed period, the communication between the terminal A and the terminal B can be reopened at once without any procedure for re-establishing the communication channel in the network.

In the prior art, the terminal adapter has two ports and can connect the terminal A also to another terminal C through the network during the fixed period where the communication channel with the terminal B is reserved being connected.

This prior art is somewhat effective for reducing load of exchanges in the communication network for establishing and releasing the virtual connection, in the case where the terminal A repeats communication with the terminal B directly, or alternately with the terminal B and the terminal C, for example, within an interval shorter than the fixed period.

However, in the prior art, the connection reservation control is performed by the terminal adapter. Therefore, there have been following problems.

The first problem is that a number of communication channels to be reserved is limited. When the terminal A intends to communicate with a terminal B, a terminal C and a terminal D in turn, for example, only one channel can be reserved without releasing, in case the number of the available communication channels is limited in two.

The second problem is that the connection reservation control should be performed without taking in consideration the usage status of the connection resources. Therefore, the connection reservation should be cancelled uniformly after the fixed period, even when there are left a lot of connection resources unused, or the connection reservation should be retained uniformly until the fixed period passes, even when all the connection resources are used.

SUMMARY OF THE INVENTION

Therefore, a primary object of the present invention is to provide a method of connection reservation control of an ATM network wherein any number of virtual connections can be reserved for a terminal without releasing the connections, as long as sufficient connection resources are left unused.

In order to achieve the object, a method of connection reservation control of an ATM communication network according to the invention comprises steps of:

reserving a virtual connection which has been used for a communication between a transmitter terminal accommodated in a first ATM exchange and a receiver terminal accommodated in a second ATM exchange of the ATM communication network without releasing the virtual connection when a connection release request of the virtual connection is requested by the transmitter terminal; and reopening the communication between the transmitter terminal and the receiver terminal by way of the virtual connection which has been reserved when a connection setup request of the same connection with the virtual connection which has been reserved is requested by the transmitter terminal.

The step of reserving comprises steps of:

registering information of the virtual connection to be reserved in a reserved-connection table of the first ATM exchange; and transmitting an OAM (Operation, Administration and Maintenance) cell of communication suspension from the first ATM exchange to the second ATM exchange by way of the virtual connection to be reserved;

The step of reserving further comprises steps of:

registering information of the virtual connection to be reserved in a reserved-connection table of the second ATM exchange by receiving the OAM cell of communication suspension; and transmitting an ATM cell of a connection release request of the virtual connection from the second ATM exchange to the receiver terminal.

The step of reopening comprises steps of:

deleting the information of the virtual connection which has been reserved from the reserved-connection table of the first ATM exchange; and transmitting an OAM cell of communication reopen from the first ATM exchange to the second ATM exchange by way of the virtual connection which has been reserved.

The step of reopening further comprises steps of:

deleting the information of the virtual connection which has been reserved from the reserved-connection table of the second ATM exchange by receiving the OAM cell of communication reopen; and transmitting an ATM cell of a connection setup request of the virtual connection from the second ATM exchange to the receiver terminal.

Therefore, any number of virtual connections can be reserved for a terminal without releasing the connections, as long as sufficient connection resources are left unused, and the reserved connection can be released at any time according to need, in the ATM exchange according to the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
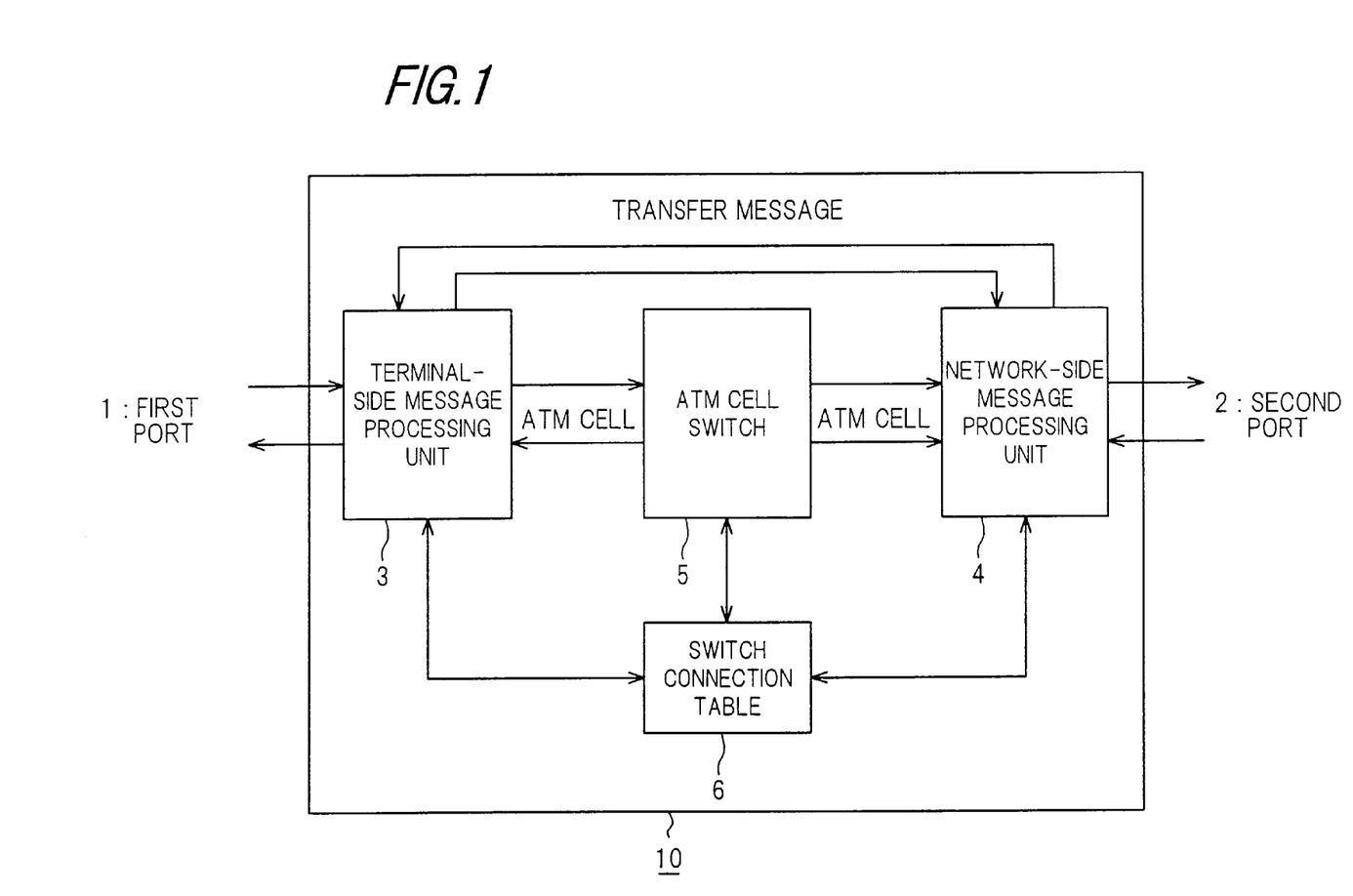
FIG. 1 is a block diagram illustrating an ATM exchange 10 according to an embodiment of the invention.

FIG. 1 is a block diagram illustrating an ATM exchange 10 according to an embodiment of the invention, comprising a terminal-side message processing unit 3 connected to a first port 1, a network-side message processing unit 4 connected to a second port 2, an ATM cell switch 5 for performing switching of ATM cells to be exchanged between the first port 1 and the second port 2, and a switch connection table 6 which is referred to by the terminal-side message processing unit 3, the network-side message processing unit 4 and the ATM cell switch 5.

There may be more number of terminal-side message processing units or the network-side message processing units each having their own ports, respectively. However, they are represented hereinafter by the terminal-side message processing unit 3 and the network-side message processing unit 4 for simplifying the description.

Among ATM cells transmitted from a terminal connected to the first port 1, ATM cells concerning a connection setup request and a connection release request are caught and processed by the terminal-side message processing unit 3, while other ATM cells are transferred to the ATM cell switch 5. When necessary, virtual channel connection information is created and registered in the switch connection table 6 by the terminal-side message processing unit 3, in accordance with the connection setup request, and, at the same time, the ATM cell of the connection setup request is transferred directly to the network-side message processing unit 4 without passing the ATM cell switch 5.

The terminal-side message processing unit 3 also takes charge of transmitting ATM cells of the connection setup request or the connection release request which are supplied from the network-side message processing unit 4 towards the terminal through the first port 1, by multiplexing them with the ATM cells supplied from the ATM cell switch 5.

In a similar way, among ATM cells arriving from the network connected to the second port 2, ATM cells concerning a connection setup request and a connection release request are caught and processed by the network-side message processing unit 4, while other ATM cells are transferred to the ATM cell switch 5. When necessary, virtual channel connection information is created by the network-side message processing unit 4 and registered in the switch connection table 6, or deleted therefrom, in accordance with the connection setup request or the connection release request, and, at the same time, the ATM cell of the connection setup request or the connection release request is transferred directly to the terminal-side message processing unit 3 without passing the ATM cell switch 5.

The network-side message processing unit 4 also takes charge of transmitting ATM cells of the connection setup request or the connection release request which are transferred from the terminal-side message processing unit 3 towards the network through the second port 2, by multiplexing them with the ATM cells supplied from the ATM cell switch 5.

Referring to the virtual channel connection information registered in the switch connection table 6, the ATM cell switch 5 switches ATM cells supplied thereto, that is, outputs the ATM cells towards the first port 1 or the second port 2, respectively, after rewriting VPI (Virtual Path Identifier) and VCI (Virtual Channel Identifier) values of the ATM cells.

Figure 2:
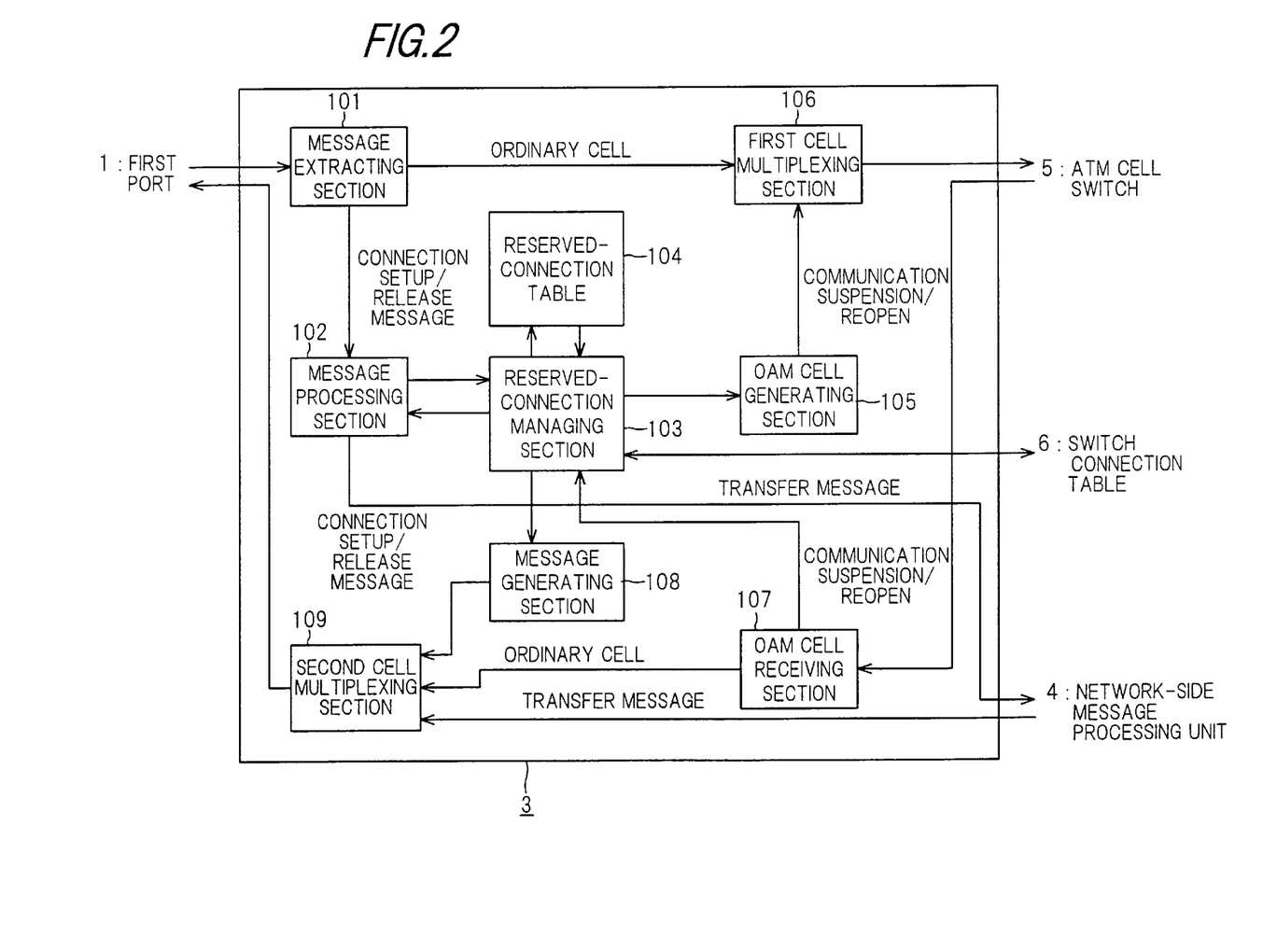
FIG. 2 is a block diagram illustrating a configuration example of the terminal-side message processing unit 3 of FIG. 1.

FIG. 2 is a block diagram illustrating a configuration example of the terminal-side message processing unit 3, comprising a message extracting section 101, a message processing section 102, a reserved-connection managing section 103, a reserved-connection table 104, an OAM (Operation, Administration and Maintenance) cell generating section 105, a first cell multiplexing section 106, an OAM cell receiving section 107, a message generating section 108 and a second cell multiplexing section 109.

The message extracting section 101 outputs ATM cells of the connection setup request and the connection release request to the message processing section 102 by extracting them from ATM cells received through the first port 1, while outputting other ATM cells to the first cell multiplexing section 106.

Receiving the ATM cells of the connection setup request and the connection release request, the message processing section 102 notifies the reserved-connection managing section 103 of the kind and contents of the ATM cells, and transfers the ATM cell of the connection setup request to the network-side message processing unit 4 when instructed by the reserved-connection managing section 103.

The message processing section 102 also generates an ATM cell of a connection release request to be transferred to the network-side message processing unit 4 in case it is instructed by the reserved-connection managing section 103.

The reserved-connection managing section 103 takes charge of revising the reserved-connection table 104, by referring to the kind and contents of the ATM cells notified from the message processing section 102, the virtual channel connection information registered in the switch connection table 6 and the virtual channel connection information registered in the reserved-connection table 104. The reserved-connection managing section 103 also takes charge of instructing the message processing section 102 to transfer the ATM cell of the connection setup request or to output the ATM cell of the connection release request to the network-side message processing unit 4. Furthermore, the reserved-connection managing section 103 instructs the OAM cell generating section 105 to output OAM cells of communication suspension or communication reopen.

The reserved-connection table 104 stores the reserved-connection information registered by the reserved-connection managing section 103. The reserved-connection information is the information of the virtual channel connections which are registered in the switch connection table 6 and whereof release has been requested by the concerning terminals but is not yet executed by the ATM exchange 10.

In other word, information of the virtual channel connections which may be released at any time is listed in the reserved-connection table 104.

When there are a plurality of terminal-side message management units, the reserved-connection table 104 is shared by them.

Figure 6:
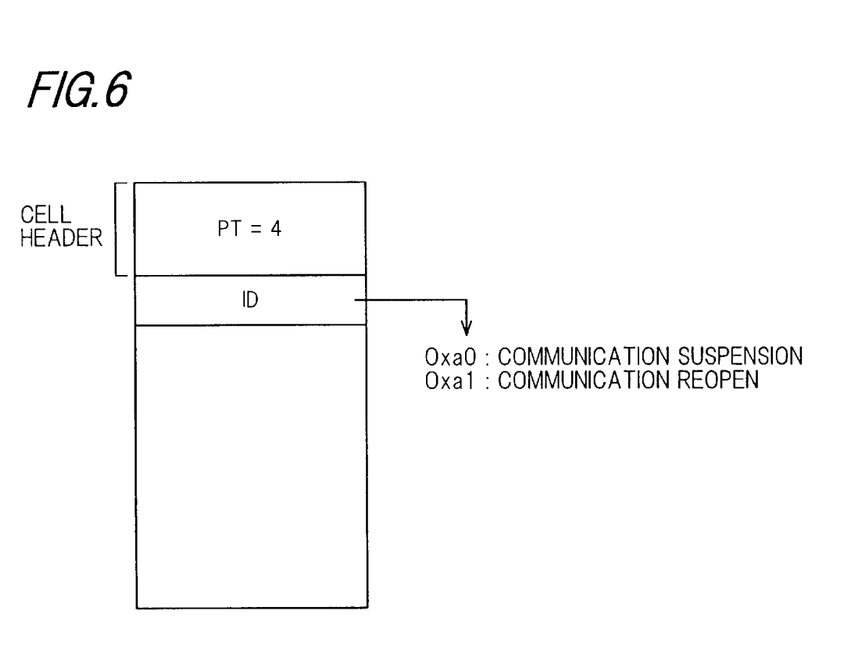
FIG. 6 is a schematic chart illustrating a format example of an OAM cell.

According to the instruction of the reserved-connection managing section 103, the OAM cell generating section 105 generates the OAM cells of the communication suspension and the communication reopen having a format as illustrated in FIG. 6, wherein the PT (Pay-load Type) field of the cell header has a value 4 and a hexadecimal 0xa0 (communication suspension) or 0xa1 (communication reopen) is described in the data field.

The first cell multiplexing section 106 outputs the OAM cells of the communication suspension or the communication reopen generated by the OAM cell generating section 105 to the ATM cell switch 5 by multiplexing them with the ATM cells supplied from the message extracting section 101.

The OAM cell receiving section 107 extracts the OAM cells of the communication suspension and the communication reopen having the format of FIG. 6 from the ATM cells supplied from the ATM cell switch 5, other ATM cells being transferred to the second cell multiplexing section 109.

Figure 4A:
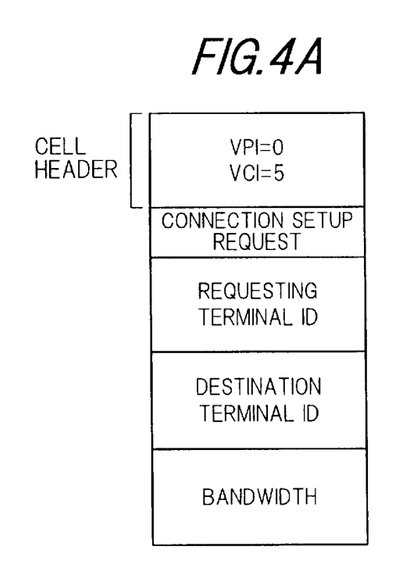
FIG. 4A is a schematic chart illustrating a format example of an ATM cell of a connection setup request.
Figure 4B:
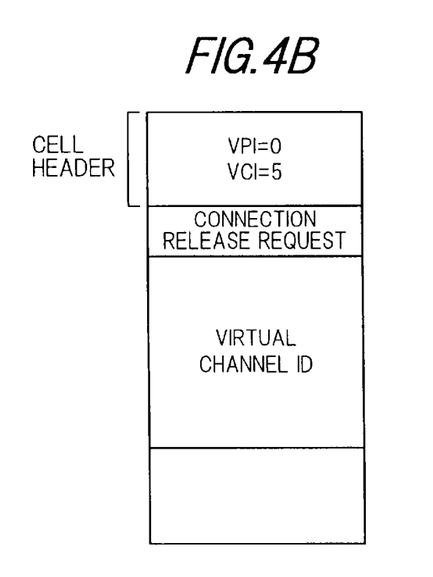
FIG. 4B is a schematic chart illustrating a format example of an ATM cell of a connection release request.

The message generating section 108 generates ATM cells of a connection setup request and a connection releasing request having formats such as illustrated in FIGS. 4A and 4B, whereof details will be described afterwards.

The second cell multiplexing section 109 multiplexes the ATM cells supplied from the network-side message processing unit 4, the OAM cell receiving section 107 and the message generating section 108. The multiplexed ATM cells are transmitted through the first port 1 towards the terminal.

Figure 3:
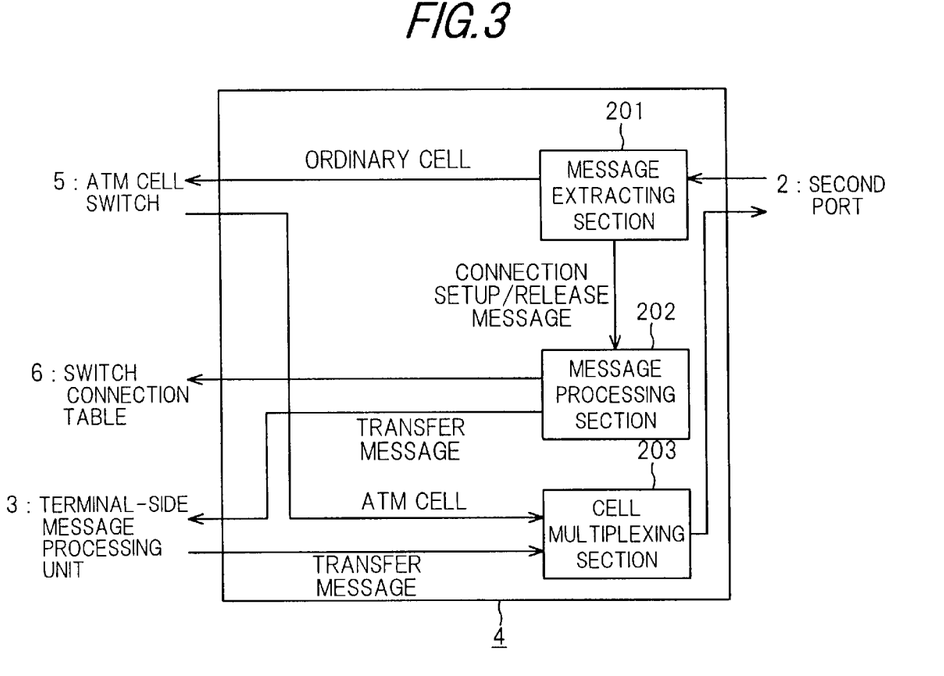
FIG. 3 is a block diagram illustrating a configuration example of the network-side message processing unit 4 of FIG. 1.

FIG. 3 is a block diagram illustrating a configuration example of the network-side message processing unit 4 of FIG. 1, comprising a message extracting section 201, a message processing section 202 and a cell multiplexing section 203.

The message extracting section 201 outputs ATM cells of the connection setup request and the connection release request to the message processing section 202 by extracting them from ATM cells received from the network through the second port 2, while outputting other ATM cells to the ATM cell switch 5.

Receiving the ATM cells of the connection setup request and the connection release request extracted by the message extracting section 201, the message processing section 202 revises the switch connection table 6, and transfers the ATM cell of the connection setup request and the connection release request to the terminal-side message processing unit 3.

The cell multiplexing section 203 multiplexes the ATM cells supplied from the terminal-side message processing unit 3 and the ATM cell switch 5 to be transmitted through the second port 2 towards the network.

The ATM cell switch 5 and the switch connection table 6 may have the same configurations with corresponding elements of the conventional ATM switches and the detailed description is omitted here.

Now, operation of the ATM exchange 10 of FIG. 1 will be described.

The procedures for the connection setup or the connection release are standardized by concerning committees such as the ITU-T or the ATM Forum.

For example, the formats of the ATM cells of the connection setup request and the connection release request are defined such as illustrated in FIGS. 4A and 4B, respectively. The VPI value and the VCI value in the cell header are defined to be 0 and 5, respectively. In the data field of the ATM cell of the connection setup request, an ID (IDentifier) representing the connection setup request is followed by the ID of a requesting terminal, the ID of a destination terminal and information of the required bandwidth, in this order. In the data field of the ATM cell of the connection release request, the ID representing the connection release is followed by the ID (VPI and VCI) of the virtual channel to be released.

When a first terminal intends to communicate with a second terminal, the first terminal transmits an ATM cell having the format of FIG. 4A to the ATM exchange wherein the first terminal is accommodated. When the communication is finished, an ATM cell having the format of FIG. 4B is transmitted from either of the terminals. Therefore, the message extracting section 101 of the terminal-side message processing unit 3 and the message extracting section 201 of the network-side message processing unit 4 monitors ATM cells arriving through the first port 1 and the second port 2, respectively, and extract ATM cells whereof VPI=0 and VCI=5, or, in other words, extract ATM cells flowing through a virtual channel of VPI=0 & VCI=5.

First, operation of the terminal-side message processing unit 3 is described in connection with ATM cells arriving from a terminal through the first port 1.

Figure 7:
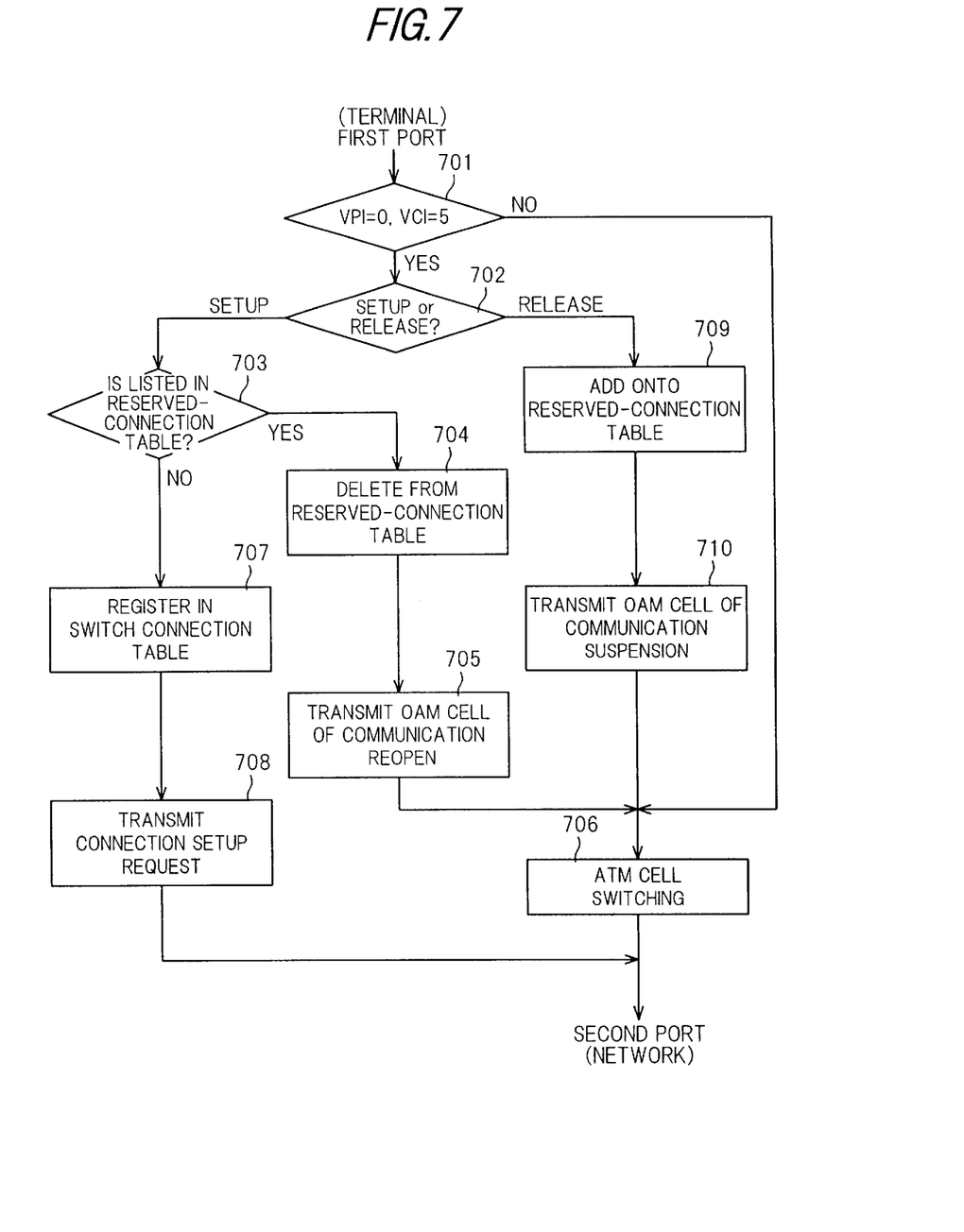
FIG. 7 is a flowchart illustrating processings performed in the terminal-side message processing unit 3 of FIG. 1 in connection with ATM cells arriving through the first port 1.

FIG. 7 is a flowchart illustrating processings performed in connection with ATM cells arriving through the first port 1.

The message extracting section 101 monitors the ATM cells arriving through the first port 1 and checks whether they have or not the identifier of VPI=0 & VCI=5 (at step 701). The ATM cells transmitted through the virtual channel of VPI=0 & VCI=5 are extracted and supplied to the message processing section 102. ATM cells of virtual channels other than VPI=0 & VCI=5 are all supplied to the ATM cell switch 5 to be cell-switched (at step 706) through the first cell multiplexing section 106.

Receiving the ATM cell of the connection setup request or the connection release request, the message processing section 102 notifies the reserved-connection managing section 103 of the kind and contents of the ATM cell. When it is the ATM cell of the connection setup request (at step 702) having the format of FIG. 4A, the reserved-connection managing section 103 checks whether the virtual connection requested by the ATM cell is listed or not in the reserved-connection table 104 (at step 703).

When the requested virtual connection is not listed in the reserved-connection table 104, the reserved-connection managing section 103 retrieves a pair of identifiers (VPI & VCI) each available in respective link connected to the first port 1 or the second port 2 for the requested virtual connection.

The retrieved identifiers are registered in the switch connection table 6 (at step 707) associated with information of the port numbers, the terminal IDs and the bandwidth required by the ATM cell, referring to which the ATM cell switch 5 switches ATM cells.

Figure 5:
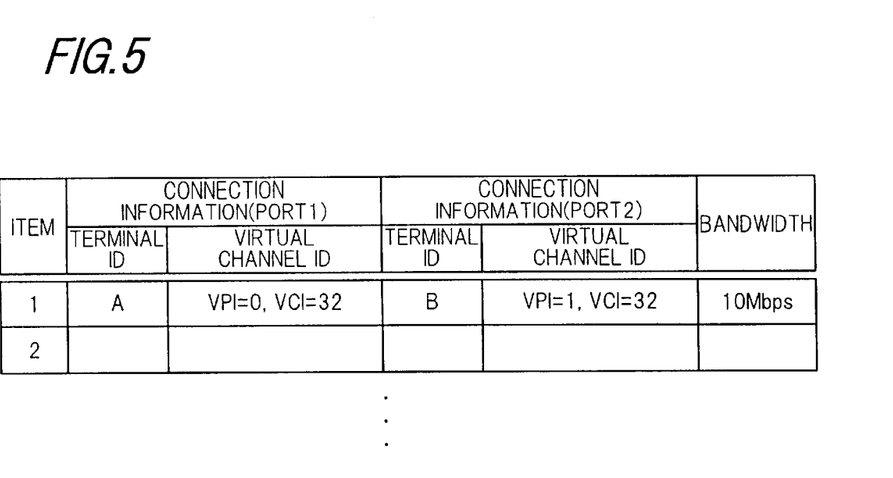
FIG. 5 is a table chart illustrating an example of information to be registered in the switch connection table 6 of FIG. 1.

FIG. 5 is a table chart illustrating an example of information to be registered in the switch connection table 6. The example shows that a virtual channel having an identifier VPI=0 & VCI=32 of the first port 1 and a virtual channel having an identifier VPI=1 & VCI=32 of the second port 2 are retrieved to be connected by the ATM switch 5 for setting up a virtual connection of a bandwidth of 10 Mbps between a terminal A to a terminal B.

Further, the reserved-connection managing section 103 instructs the message processing section 102 to transmit (at step 708) the ATM cell of the connection setup request towards the network through the network-side message processing unit 4, when the requested virtual connection is not listed in the reserved-connection table 104.

When the same connection with the requested virtual connection is listed in the reserved-connection table 104 (at step 703), the reserved-connection managing section 103 deletes the information of the concerning connection from the reserved-connection table 104 (at step 704), and instructs the OAM cell generating section 105 to output (at step 705) an OAM cell of communication reopen having the format of FIG. 6 to be switched by the ATM cell switch 5 (at step 706) with the virtual channel identifier (VPI & VCI) of the first port 1 assigned to the concerning connection.

When the ATM cell extracted by the message extracting section 101 is an ATM cell of connection release request having the format of FIG. 4B (at step 702), the reserved-connection managing section 103 retrieves information of the concerning connection from the switch connection table 6 and add the same information to the reserved-connection table 104 (at step 709). At the same time, the reserved-connection managing section 103 instructs the OAM cell generating section 105 to output an OAM cell of communication suspension having the format of FIG. 6 (at step 710) with the virtual channel identifier (VPI & VCI) of the first port 1 assigned to the concerning connection to be switched by the ATM cell switch 5 (at step 706).

Figure 8:
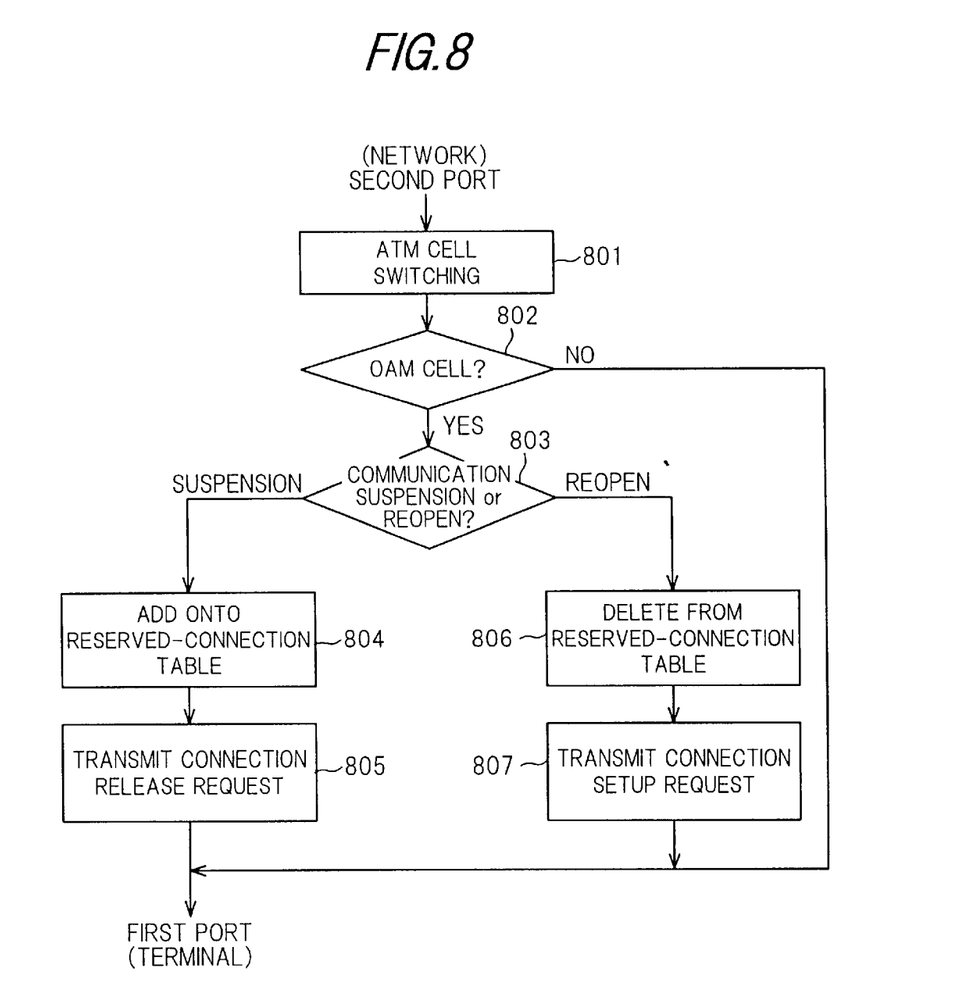
FIG. 8 is a flowchart illustrating processings performed in the terminal-side message processing unit 3 in connection with ATM cells supplied from the ATM cell switch 5 of FIG. 1.

Now, operation of the terminal-side message processing unit 3 concerning ATM cells supplied from the ATM cell switch 5 is described referring to a flowchart of FIG. 8.

The OAM cell receiving section 107 monitors ATM cells supplied (at step 801) from the ATM cell switch 5 and extracts OAM cells having the format of FIG. 6 by checking the PT field of the cell header (at 802). The kind and contents of the OAM cells are notified to the reserved-connection managing section 103. The ATM cells other than the OAM cells are supplied to the second cell multiplexing section 109 to be transmitted towards the terminal through the first port 1.

When the extracted ATM cell is the OAM cell of communication suspension (at step 803), the reserved-connection managing section 103 retrieves information of a corresponding connection in the switch connection table 6 and adds the same information onto the reserved-connection table 104 (at step 804). The reserved-connection managing section 103 also instructs the message generating section 108 to generate an ATM cell of connection release request having the format of FIG. 4B, which is transmitted (at step 805) towards the terminal through the second cell multiplexing section 109.

When the extracted ATM cell is the OAM cell of communication reopen (at step 803), the reserved-connection managing section 103 retrieves information of a corresponding connection in the reserved-connection table 104 and deletes the information of the corresponding connection from the reserved-connection table 104 (at step 806). The reserved-connection managing section 103 also instructs the message generating section 108 to generate an ATM cell of connection setup request, which is transmitted (at step 807) towards the terminal through the second cell multiplexing section 109.

Now, operation of the network-side message processing unit 4 is described referring to FIG. 3 in connection with ATM cells arriving from the second port 2. The network-side message processing unit 4 operates substantially in the same way with the corresponding unit of an ordinary ATM exchange.

When an ATM cell of connection setup request is received from the network through the virtual channel of VPI=0 & VCI=5 of the second port 2, the message processing section 202 of the network-side message processing unit 4 retrieves a pair of identifiers (VPI & VCI) each available in respective link connected to the first port 1 or the second port 2 for setting up the requested virtual connection, and, at the same time, the received ATM cell of the connection setup request is transmitted towards the first port 1 by way of the terminal-side message processing unit 3.

The retrieved identifiers are registered in the switch connection table 6 associated with information of the port numbers, the terminal IDs and the bandwidth required by the ATM cell of the connection setup request, to be referred to by the ATM cell switch 5.

When an ATM cell of connection release request is received from the network through the virtual channel of VPI=0 & VCI=5 of the second port 2, the message processing section 202 of the network-side message processing unit 4 retrieves the corresponding information in the switch connection table 6 and deletes the information therefrom, and, at the same time, the received ATM cell of the connection release request is transmitted towards the first port 1 by way of the terminal-side message processing unit 3.

ATM cells arriving through virtual channels other than VPI=0 & VCI=5 of the second port 2 are all supplied to the ATM cell switch 5 as they are.

The ATM cell switch 5 switches ATM cells supplied thereto referring to the switch connection table 6 of FIG. 5, that is, outputs ATM cells supplied from the terminal-side message processing unit 3 (or the network-side message processing unit 4) to the network-side message processing unit 4 (or the terminal-side message processing unit 3) after rewriting the VPI and VCI values referring to the switch connection table 6.

As heretofore described, the terminal-side message processing unit 3 registers a new connection information in the switch connection table 6 only when a new combination of the requesting terminal, the destination terminal and the required bandwidth is described in an ATM cell of the connection setup request received from the first port 1.

The terminal-side message processing unit 3 does not delete the connection information from the switch connection table 6 even when an ATM of the connection release request of a virtual channel connection, which is once established, is received from the first port 1, nor transmits the ATM cell of the connection release request towards the network, but registers the same connection information in the reserved-connection table 104 and transmits an OAM cell of communication suspension by way of the virtual connection.

Therefore, when an ATM of a connection setup request having the same description is received from the first port 1, the terminal-side message processing unit 3 can reopen the requested communication by deleting the corresponding information from the reserved-connection table 104 and transmitting an OAM cell of communication reopen by way of the already established connection, without needing to retrieve again an available virtual channel in any link.

Now, operation of an ATM communication network, wherein ATM exchanges of the embodiment of FIG. 1 are applied, will be described referring to schematic diagrams of FIGS. 9A to 9D.

In FIGS. 9A to 9D, the ATM communication network is represented with a transmitter terminal A, a transmitter-side ATM exchange 11 accommodating the transmitter terminal A, a receiver-side ATM exchange 12, a receiver terminal B accommodated in the receiver-side ATM exchange 12, and an intermediate ATM exchange 13 connecting the transmitter-side ATM exchange 11 to the receiver-side ATM exchange 12.

In FIGS. 9A to 9D, it is assumed that the ATM exchange 10 of the embodiment of FIG. 1 is applied to the transmitter-side ATM exchange 11 and the receiver-side ATM exchange 12, and an ordinary conventional ATM exchange is applied to the intermediate ATM exchange 13.

Figure 9A:
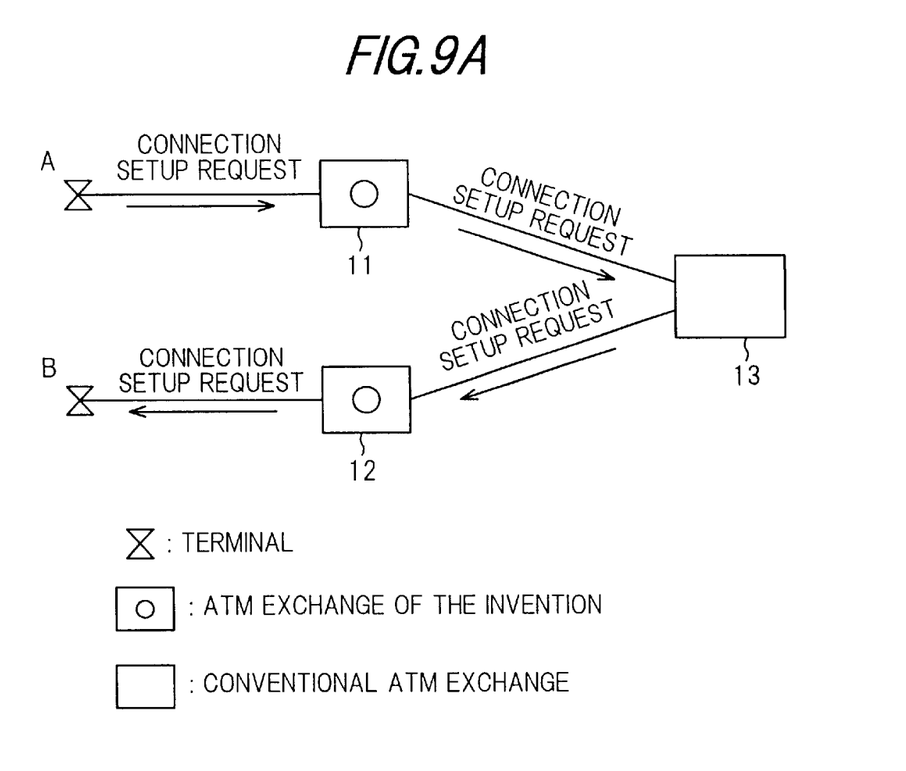
FIG. 9A is a schematic chart illustrating procedures for establishing a virtual connection between terminals A and B for the first.

In the initial state, no virtual channel connection is registered in the switch connection table 6 of any of the transmitter-side ATM exchange 11, the intermediate ATM exchange 13 and the receiver-side ATM exchange 12.

When an ATM cell of a connection setup request having the format of FIG. 4A is transmitted for the first from the transmitter terminal A towards the receiver-terminal B, as illustrated in FIG. 9A. It is processed in the terminal-side message processing unit 3 of the transmitter-side ATM exchange 11. The control procedure flows along steps 701–702–703–707–708 of FIG. 7.

Thus, virtual channel connection information such as illustrated in FIG. 5 (VPI=0 & VCI=32: VPI=1 & VCI=32) is registered, for example, in the switch connection table 6 of the transmitter-side ATM exchange 11, and an ATM cell of the same connection setup request is transmitted towards the intermediate ATM exchange 13.

Figure 9B:
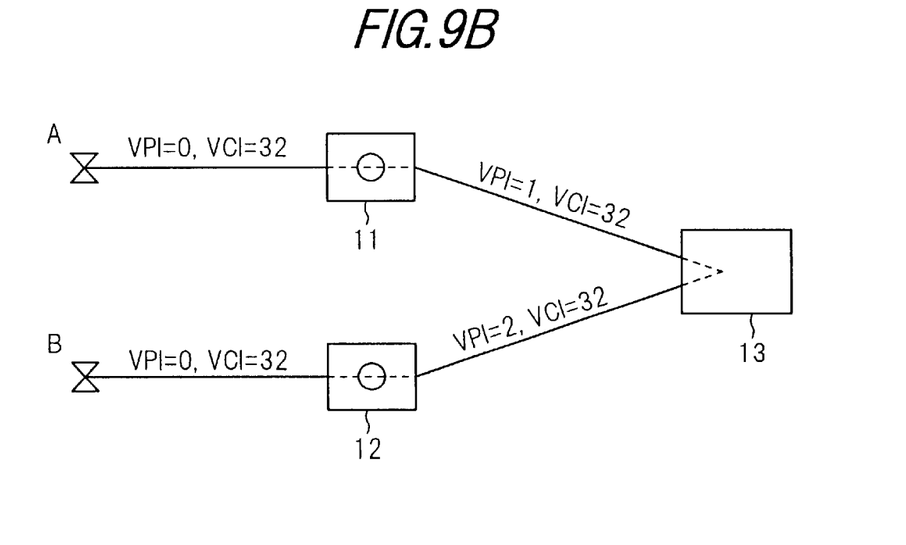
FIG. 9B is a schematic chart illustrating a virtual connection established between the terminals A and B.

In a similar way, virtual channel connection information (VPI=1 & VCI=32: VPI=2 & VCI=32) and (VPI=2 & VCI=32: VPI=0 & VCI=32) is registered, for example, in the switch connection table 6 of the intermediate ATM exchange 13 and the receiver-side ATM exchange 12, respectively, and an ATM cell of the same connection setup request arrives to the receiver terminal B, enabling the transmitter terminal A to communicate with the receiver terminal B by way of the connected virtual channels, as shown in FIG. 9B.

Figure 9C:
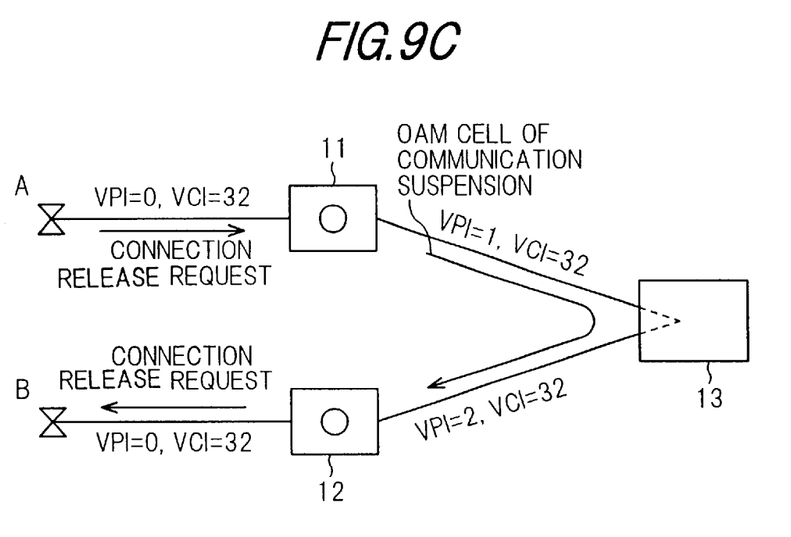
FIG. 9C is a schematic chart illustrating procedures performed when a connection release is requested from the terminal A.

When the transmitter terminal A transmits an ATM cell of the connection release request of the virtual channel of VPI=0 & VCI=32 which has been on use, as illustrated in FIG. 9C, the control procedure in the transmitter-side ATM exchange 11 flows along steps 701–702–709–710 of FIG. 7. The corresponding connection information is added onto the reserved-connection table 104, and an OAM cell of communication suspension having a channel identifier of VPI=0 & VCI=32 is generated by the OAM call generating section 105, which is transmitted to the intermediate ATM exchange 13 after the channel identifier is rewritten into VPI=1 & VCI=32 by the ATM cell switch 5 according to the switch connection table 6.

The channel identifier of the OAM cell of the communication suspension is converted into VPI=2 & VCI=32 in the intermediate ATM exchange 13 and arrives to the receiver-side ATM exchange 12.

In the receiver-side ATM exchange 12, the channel identifier of the OAM cell is again converted into VPI=0 & VCI=32 by the ATM cell switch 5 and caught by the OAM cell receiving section 107 of the terminal-side message processing unit 3, along steps of 801–802–803 of FIG. 8. Therefore, the corresponding connection information is added onto the reserved-connection table 104 of the receiver-side ATM exchange 12, and an ATM cell of the connection release request is transmitted to the terminal B.

Receiving the ATM cell of the connection release request, the receiver terminal B releases the virtual channel of VPI=0 & VCI=32 described therein.

Thus, the transmitter terminal A and the receiver terminal B stop the communication between them and release the respective virtual channels used for the communication. However, in every of the transmitter-side ATM exchange 11, the intermediate ATM exchange 13 and the receiver-side ATM exchange 12, the concerning virtual channels are left connected as they are without being released.

Figure 9D:
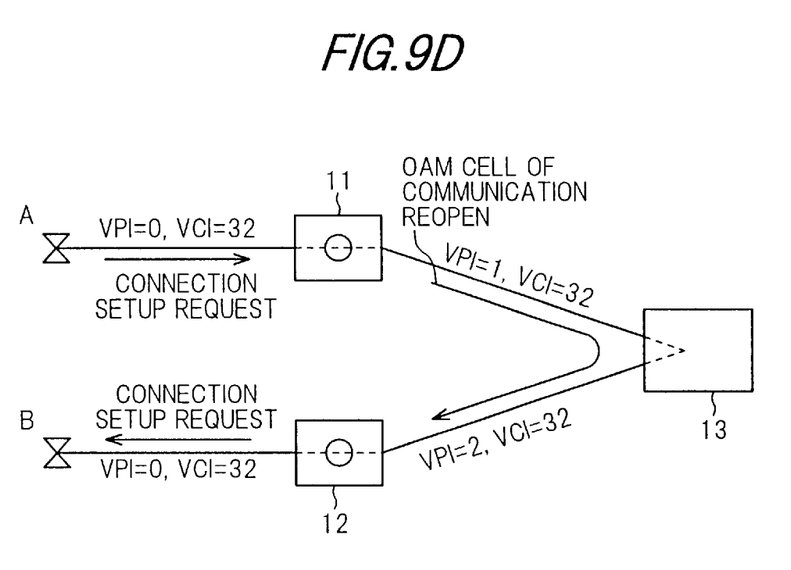
FIG. 9D is a schematic chart illustrating procedures performed when a connection setup of the reserved connection is requested from the terminal A.

FIG. 9D illustrates the procedure performed when the communication is reopened. The transmitter terminal A transmits the same ATM cell as is transmitted in FIG. 9A, that is, an ATM cell of connection setup request, which is processed by terminal-side message processing unit 3 of the transmitter-side ATM exchange 11. The reserved-connection managing section 103 checks the reserved-connection table 104 and finds, this time, that the same connection information is listed there. So, the control procedure flows along steps 701–702–704–705–706. The corresponding connection information (VPI=0 & VCI=32: VPI=1 & VCI=32) is deleted from the reserved-connection table 104 and an OAM cell of the communication reopen having a channel identifier VPI=0 & VCI=32 is generated by the OAM generating section 105, which is transmitted to the intermediate ATM exchange 13 after the channel identifier is rewritten into VPI=1 & VCI=32 by the ATM cell switch 5 according to the switch connection table 6.

The channel identifier of the OAM cell of the communication reopen is converted into VPI=2 & VCI=32 in the intermediate ATM exchange 13 and arrives to the receiver-side ATM exchange 12.

In the receiver-side ATM exchange 12, the channel identifier of the OAM cell is again converted into VPI=0 & VCI=32 by the ATM cell switch 5 and caught by the OAM cell receiving section 107 of the terminal-side message processing unit 3. This time, the control procedure flows along steps of 801–802–803–806–807. Therefore, the corresponding connection information is deleted from the reserved-connection table 104 of the receiver-side ATM exchange 12, and an ATM cell of the connection setup request is transmitted to the terminal B.

Receiving the ATM cell of the connection setup request, the receiver terminal B connects the virtual channel of VPI=0 & VCI=32 described therein with itself.

Thus, the transmitter terminal A and the receiver terminal B reopens the communication between them by simply connecting the respective virtual channels reserved for the communication. Complicated processings for newly setting up a virtual connection such as retrieving available virtual channels in both links and registering their connection information in the switch connection table are not needed in any of the transmitter-side ATM exchange 11, the intermediate ATM exchange 13 and the receiver-side ATM exchange 12.

In the example of FIGS. 9A to 9D, the transmitter-side ATM exchange 11 and the receiver-side ATM exchange 12 are connected by way of only one intermediate ATM exchange 13. However, they may be connected through more than one intermediate ATM exchanges.

Furthermore, the transmitter-side ATM exchange 11 and the receiver-side ATM exchange 12 are both described to be ATM exchanges according to the present invention. However, there may be a receiver-side ATM exchange whereto an ordinary ATM exchange is applied.

In this case, a table list of receiver terminals accommodated in ordinary conventional ATM exchanges (or, ATM exchanges according to the invention) should be provided to the terminal-side message processing unit 3 of the transmitter-side ATM exchange 11. When the reserved-connection managing section 103 is notified of an connection setup request for the first, it checks whether the destination terminal is accommodated or not in a conventional ATM exchange referring to the table list, and registers the checks result in the switch connection table 6 together with other information (at step 707 of FIG. 7), and when the reserved-connection managing section 103 is notified of a connection release request, it decides (before step 709), according to the above check result registered in the switch connection table 6, whether the concerning connection is to be reserved by adding the connection information onto the reserved-connection table 104 or to be released in the same way with the ordinary ATM exchange, that is, to delete the connection information from the switch connection table 6 and to instruct the message processing section 102 to transmit the ATM cell of the connection release request towards the network through the network-side message processing unit 4.

Still further, it is assumed in the above description that enough virtual channel identifier resources (the VPI and VCI values) are always available. However, the number of virtual channel identifier resources is limited, and when the reserved connections are too accumulated, they should be released in some way.

In the ATM exchange 10 according to the invention, the information of the virtual channel connections which may be released at any time is listed in the reserved-connection table 104, as previously described. Therefore, a release control of the reserved connection may be performed easily as follows, for example.

When the reserved-connection managing section 103 retrieves a pair of identifiers (VPI & VCI) each available in respective link connected to the first port 1 or the second port 2 for the requested virtual connection (at step 707 of FIG. 7), it is checked whether an available percentage of the identifiers (VPI & VCI) is smaller or not than a threshold value in each link. When the available percentage is found smaller than the threshold value, oldest one or some of the reserved connections listed in the reserved-connection table 104 are picked out to be released actually, that is, to be deleted from both the reserved-connection table 104 and the switch connection table 6. The reserved-connection managing section 103 instructs the message processing section 102 to output an ATM cell of the connection release request for each of the picked-up connections to be released. The ATM cells of the connection release request are transmitted towards the network through the network-side message processing unit 4.

As heretofore described, any number of virtual connections can be reserved for a terminal without releasing the connections, as long as sufficient connection resources are left unused, and the reserved connection can be released at any time according to need, in the ATM exchange according to the invention.

What is claimed is:

1. A method of connection reservation control of an ATM (Asynchronous Transfer Mode) communication network, comprising:

reserving a virtual connection which has been used for communication between a transmitter terminal in a first ATM exchange and a receiver terminal in a second ATM exchange of the ATM communication network without releasing the virtual connection when a connection release request of the virtual connection is requested by the transmitter terminal; and reopening the communication between the transmitter terminal and the receiver terminal by way of the reserved virtual connection when a connection setup request of the same connection with the virtual connection which has been reserved is requested by the transmitter terminal, wherein information of virtual connections concerning the first ATM exchange is stored in said first ATM exchange, and information of said reserved connection is stored in said transmitter terminal.

2. The method of claim 1, wherein said reserving comprises:

registering information of the virtual connection to be reserved in a reserved-connection table of the first ATM exchange; and transmitting an OAM (Operation, Administration and Maintenance) cell of communication suspension from the first ATM exchange to the second ATM exchange by the virtual connection to be reserved.

3. The method of claim 2, wherein said reserving further comprises:

registering information of the virtual connection to be reserved in a reserved-connection table of the second ATM exchange by receiving the OAM cell of communication suspension; and transmitting an ATM cell of a connection release request of the virtual connection from the second ATM exchange to the receiver terminal.

4. The method of claim 1, wherein said reopening comprises:

deleting the information of the virtual connection reserved from a reserved-connection table of the first ATM exchange; and transmitting an OAM (Operation, Administration and Maintenance) cell of communication reopen from the first ATM exchange to the second ATM exchange by the reserved virtual connection.

5. The method of claim 2, wherein said reserving further comprises:

deleting the information of the virtual connection reserved from the reserved-connection table of the second ATM exchange by receiving the OAM cell of communication reopen; and transmitting an ATM cell of a connection setup request of the virtual connection from the second ATM exchange to the receiver terminal.

6. An ATM exchange comprising:

a switch connection table wherein information of virtual connections concerning the ATM exchange is registered;

an ATM cell switch for switching ATM cells to be exchanged among a plurality of ports referring to the switch connection table;

a reserved-connection table wherein information of reserved connections, which are virtual connections once connected to terminals accommodated in the ATM exchange and when releases have been requested but not executed, is registered; and a terminal-side message processing unit for performing a reservation control of the virtual connections.

7. The ATM exchange as recited in claim 6, wherein the terminal-side message processing unit reserves a virtual connection when an ATM cell of a connection release request of the virtual connection is received from a terminal in the ATM exchange, and has been performing communication via the virtual connection to be reserved, by registering information of the virtual connection in the reserved-connection table and transmitting an OAM cell of communication suspension to an ATM exchange which accommodates a destination terminal of the communication via the virtual connection without releasing the virtual connection, and reserves a virtual connection when an OAM (Operation, Administration and Maintenance) cell of communication suspension is received by way of the virtual connection to be reserved, by registering information of the virtual connection in the reserved-connection table and transmitting an ATM cell of a connection release request to a destination terminal of the virtual connection.

8. The ATM exchange as recited in claim 7, wherein the terminal-side message processing unit reopens communication via a virtual connection registered in the reserved-connection table when an ATM cell of a connection setup request of the same connection with the virtual connection is received from a terminal in the ATM exchange, by deleting information of the virtual connection from the reserved-connection table and transmitting an OAM cell of communication reopen to an ATM exchange which accommodates a destination terminal of the communication by way of the virtual connection, and reopens a communication by way of a virtual connection registered in the reserved-connection table when an OAM cell of communication reopen is received by way of the virtual connection, by deleting information of the virtual connection from the reserved-connection table and transmitting an ATM cell of a connection setup request to a destination terminal of the virtual connection.

9. The ATM exchange of claim 6, said terminal-side message processing unit comprising:
   a first message extracting section that receives an ATM cell and an OAM (Operation, Administration and Maintenance) cell from one of said terminals of a first port of said ports;
   a first cell multiplexing section that receives said ATM cell from said first message extracting section, and forwards said ATM cell to said ATM cell switch;
   a first message processing section that receives said OAM cell from said first message extracting section, and generates an output to at least one of a reserved-connection managing section and a network-side message processing unit; and
   an OAM cell generating section that controls said first cell multiplexing section in response to an output from said reserved-connection generating section, wherein said reserved-connection managing section communicates with said reserved-connection table and said switch connection table independently.

10. The ATM exchange of claim 9, further comprising:
   an OAM cell receiving section that receives at least one of said OAM cell and said ATM cell from said ATM cell switch; and
   a second cell multiplexing section that receives at least one of: (a) a transfer message from said network-side message processing unit, (b) said ATM cell from said OAM cell receiving station, and (c) a message from a message generating section, wherein said second cell multiplexing section transmits a multiplexed output to said one of said terminals.

11. The ATM exchange of claim 9, said network-side message processing unit comprising:
   a second message extracting section that receives said ATM cell and said OAM cell from one of said terminals of a second port of said ports;
   another first cell multiplexing section that receives said ATM cell from said second message extracting section, and forwards said ATM cell to said ATM cell switch; and a second message processing section that receives said OAM cell from said second message extracting section, and generates an output to at least one of said switch connection table and said terminal-side message processing unit.

12. The ATM exchange of claim 11, further comprising:
   another cell multiplexing section that receives at least one of said ATM cell and said transfer message from said terminal-side message processing unit, and generates an output to said second port.

13. The ATM exchange of claim 6, wherein said reserved-connection table is in said terminal-side message processing unit.

14. The method of claim 1, further comprising:
   receiving an ATM cell and an OAM cell from a terminal of a first port, in a first message extracting section;
   receiving said ATM cell from said first message extracting section in a first cell multiplexing section, and forwarding said ATM cell to said ATM cell switch;
   receiving said OAM cell from said first message extracting section in a first message processing section, and generating an output to at least one of a reserved-connection managing section and a network-side message processing unit;
   controlling said first cell multiplexing section by an OAM cell generating section, in response to an output from said reserved-connection generating section; and
   said reserved-connection managing section communicating with said reserved-connection table and said switch connection table independently.

15. The method of claim 14, further comprising:
   receiving at least one of said OAM cell and said ATM cell from said ATM cell switch in an OAM cell receiving section; and
   receiving at least one of: (a) a transfer message from said network-side message processing unit, (b) said ATM cell from said OAM cell receiving station, and (c) a message from a message generating section a second cell multiplexing section, said second cell multiplexing section transmitting a multiplexed output to said one of said terminals.

16. The method of claim 14, further comprising, at said network-side message processing unit:
   receiving said ATM cell and said OAM cell from one of said terminals of a second port in a second message extracting section;
   receiving said ATM cell from said second message extracting section from another first cell multiplexing section, and forwarding said ATM cell to said ATM cell switch; and
   receiving said OAM cell from said second message extracting section in a second message processing section, and generating an output to at least one of said switch connection table and a terminal-side message processing unit.

17. The method of claim 16, further comprising:
   receiving at least one of said ATM cell and said transfer message from said terminal-side message processing unit in another cell multiplexing section, and generating an output to said second port.

18. The method of claim 16, wherein said reserved-connection table is in said terminal-side message processing unit.

* * * * *